United States Patent [19]
Beale et al.

[11] Patent Number: 5,895,456
[45] Date of Patent: Apr. 20, 1999

[54] ONBOARD CURRENCY AND VALUE CARD EXCHANGER

[75] Inventors: Ivor Donald Beale, Mission Viejo; Dau Ngoc Hoang, Aliso Viejo; John Hill Wetzel, Glendora; Thomas Marks Lee, Studio City, all of Calif.

[73] Assignee: Inflight ATI, Inc., Portola Hills, Calif.

[21] Appl. No.: 08/714,560

[22] Filed: Sep. 16, 1996

[51] Int. Cl.$^6$ ................................................. G06F 15/30
[52] U.S. Cl. ........................... 705/39; 705/42; 239/379
[58] Field of Search .................. 705/39, 42; 239/379

[56] References Cited

U.S. PATENT DOCUMENTS

| | | | |
|---|---|---|---|
| 4,251,867 | 2/1981 | Uchida et al. | 705/39 |
| 4,953,086 | 8/1990 | Fukatsu | 705/42 |
| 5,670,768 | 9/1997 | Modiano et al. | 239/379 |

*Primary Examiner*—Allen R. MacDonald
*Assistant Examiner*—Jagdish Patel
*Attorney, Agent, or Firm*—Noel F. Heal

[57] ABSTRACT

A system, and corresponding method for its use, for performing various monetary transactions in a vehicle such as an aircraft, including exchanging one currency for another, obtaining currency using traveler's checks or a credit or debit card, and dispensing value cards purchased with cash or credit/debit cards. The value cards may be, for example, long-distance telephone usage cards or gaming cards, and the value cards may be increased in value or exchanged for cash using the system of the invention. A key feature of the system is that cash is always distributed in the currency of the next destination of the aircraft, as determined from flight management system data available on the aircraft. At each intermediate destination, a note dispenser is conditioned to dispense only the currency of the next destination.

24 Claims, 10 Drawing Sheets

7.0 CREDIT/ATM CARD WITHDRAWAL

7.1 DISPLAY INSTRUCTIONS FOR CUSTOMER

7.2 READ CARD DATA AND OBTAIN CUSTOMER P.I.N.

7.3 OBTAIN AUTHORIZATION THROUGH AIRCRAFT COMMUNICATION SYSTEM

7.4 UPON APPROVAL, DISPLAY TERMS AND CONDITIONS

7.5 WAIT FOR CUSTOMER ACCEPTANCE; DISPENSE CURRENCY; PRINT A RECEIPT AND DISPLAY FINAL INSTRUCTIONS

```
10.0 GAMING CASH WITHDRAWAL
            │
            ▼
    10.1
    DISPLAY INSTRUCTIONS
    FOR CARD INSERTION
            │
            ▼
    10.2
    READ GAMING CARD AND
    DETERMINE CASH VALUE
            │
            ▼
    10.3
    DISPLAY TERMS AND
    CONDITIONS OF TRANS.
            │
            ▼
    10.4
    UPON CUSTOMER
    APPROVAL, DISPENSE
    CASH AS DESTINATION
    CURRENCY
            │
            ▼
    10.5
    PRINT RECEIPT AND
    DISPLAY FINAL
    INSTRUCTIONS
```

ONBOARD CURRENCY AND VALUE CARD EXCHANGER

BACKGROUND OF THE INVENTION

This invention relates generally to currency dispensing and value card dispensing systems and, more particularly, to systems of this type suitable for use in aircraft or other passenger carrying vehicles. International travelers are well aware of the need to carry multiple currencies, and of the inconvenience that frequently ensues when one arrives at a destination without a supply of the local currency. Currency changing facilities are usually available at major airports, train stations, banks, and even in stores, but busy air travelers who forget or do not allow enough time to exchange their currency at a point of departure may prefer not to take the time needed to buy local currency at their destination.

A possible solution that has been proposed is to provide a cash dispensing machine in an aircraft. (See, for example, European Patent Application No. 94120354.9, filed Dec. 21, 1994, Andrea Modiano, inventor.) Airline passengers, particularly on long international trips, typically have plenty of time available for such tasks as exchanging their currency to the currency of their destination country. An onboard machine for this purpose would fulfill a significant need for the passengers. Unfortunately, however, the practicalities of modern air travel do not make it easy to design such a currency dispenser. Most aircraft on international routes fly multiple flight legs before being serviced, and these flight legs usually take the aircraft to multiple countries having different currencies. In most cases, each aircraft flies up to four flight legs before being serviced at an airline hub of operations. It would be impractical, and in some cases impossible, to service a currency dispensing machine at the intermediate destinations, so the dispensing machine must be capable of dispensing at least four separate currencies, and accepting multiple currencies in exchange. The system described generally in the European patent application referenced above attempts to achieve these functions by employing multiple currency note cassettes and multiple currency acceptance units. The system is extremely bulky and must be rolled on and an off the aircraft for servicing. Moreover, although the dispenser is controlled by a computer, it is not clear how the control functions are performed and, in particular, how the appropriate currency is selected.

Accordingly, there is a need for a currency exchange system of more compact construction, suitable for installation on an aircraft and able to dispense multiple currencies as the need arises during a flight having multiple legs. The present invention satisfies this need. In addition, it would be highly desirable to incorporate other related functions into a currency exchange system, specifically the ability to read various value cards, such as credit or debit cards, and the ability to dispense value cards for use in making telephone calls, or for use in gaming machines. The present invention meets these requirements also.

SUMMARY OF THE INVENTION

The present invention resides in an onboard currency dispensing system capable of dispensing multiple currencies consistent with the next destination of a vehicle. Briefly, and in general terms the system of the invention comprises a note dispenser for storing notes of multiple currencies corresponding to countries at which the vehicle will arrive in the course of an itinerary between service points; a validation subsystem, for validating tokens of value inserted into the validation subsystem by a customer; a control computer coupled to the note dispenser and to the validation subsystem; a navigation interface coupled to the control computer, to supply data defining the vehicle's location and next destination in its itinerary; means in the control computer for determining a next destination currency based on data obtained from the navigation interface; and means in the control computer for conditioning the note dispenser to dispense only the next destination currency, whereby the system automatically dispenses only appropriate currency as the vehicle progresses along its itinerary.

More specifically, the note dispenser stores the multiple currencies in at least one stack in which the currencies are arranged sequentially, consistent with the vehicle's itinerary. The note dispenser includes a rejected note cassette, and the means for conditioning the note dispenser includes means for passing all unused notes of a prior destination currency into the rejected note cassette, thereby conditioning the note dispenser to dispense the next destination currency.

In a preferred embodiment of the invention, the validation subsystem includes a note validator for accepting and validating notes of various currencies. The validation subsystem also preferably includes a card reader, for reading an encoded card having inherent value, and means, under control of the control computer, for obtaining authorization to charge the card for purchased currency. The encoded card may be a credit or debit card, or a special-purpose value card.

The system of the invention may also include means for accepting and validating traveler's checks, whereby cash in the destination currency may be dispensed in exchange for a traveler's check. The system may also include a value card dispenser, for dispensing an encoded card in exchange for media accepted and validated by the validation subsystem. The token accepted and validated may itself be a value card. Thus a value card may be purchased or increased in value using the system of the invention. Alternatively, the tokens accepted and validated by the validation subsystem may include notes of multiple currencies, thus allowing a value card to be purchased for cash.

In all of the forms of the invention summarized above, the system also preferably includes a coin dispenser, for dispensing coins in multiple currencies as needed to supplement the dispensed notes. Ideally, two denominations of notes and two denominations of coins are made available in each currency.

In terms of a novel method for exchanging currency on an aircraft, the invention comprises the steps of loading a note dispenser with bills of multiple currencies when the aircraft is serviced on the ground; obtaining flight management data from a flight management data system on the aircraft, the flight management data including flight identification and destination data; identifying a next destination currency based on the flight management data; accepting and validating payment presented by a customer desiring to take part in a monetary transaction; and dispensing cash in the next destination currency in response to the customer's presentation of payment.

More specifically, the method also comprises the step of conditioning the note dispenser to dispense a different next destination currency upon reaching an intermediate destination. The step of accepting and validating may include accepting and validating notes of various selected currencies, or accepting and validating traveler's checks, or accepting and validating an encoded value card.

The method of the invention may also be defined in terms of a method for handling monetary transactions in an aircraft, comprising the steps of loading a note dispenser with bills of multiple currencies when the aircraft is serviced on the ground; obtaining flight management data from a flight management data system on the aircraft, the flight management data including flight identification and destination data; identifying a next destination currency based on the flight management data; accepting and validating a payment submitted by a customer; dispensing a value card in response to the submission of payment; and dispensing change to the customer, if needed, in the form of cash in the next destination currency. In one variant of the invention, the method also includes accepting and validating the value card as containing inherent value; and dispensing cash in the next destination currency, in exchange for reduction of the inherent value of the value card.

It will be appreciated from the foregoing that the present invention represents a significant advance in the field of automated machines for performing monetary transactions in an international environment. The invention provides a system for dispensing currency in exchange for valuable consideration supplied by a customer, which may take the form of cash in various currencies, a credit or debit card, a traveler's check, or a special-purpose value card. The system of the invention always distributes cash in the form of the currency of the next destination of the aircraft, and achieves this objective without the need for large numbers of note cassettes associated with the note dispenser. Other aspects and advantages of the invention will become apparent from the following more detailed description, taken in conjunction with the accompanying drawings, which are briefly described below.

DESCRIPTION OF THE PREFERRED EMBODIMENT

As shown in the drawings for purposes of illustration, the present invention pertains to a system for dispensing currency in exchange for other currency, traveler's checks or various types of encoded cards, such as credit cards, automatic teller machine (ATM) debit cards, or special purpose "value" cards issued for use in gaming machines or for other purposes. Although currency exchange machines and ATM machines are not new, the provision these functions in the environment of an aircraft or similar vessel poses special problems.

For international travel, the currency dispensing system must be able to accept multiple currencies and dispense multiple currencies, but without adding undue weight to the system apparatus. Moreover, the system must ideally be completely automatic, since servicing while in flight, or at intermediate way-points in a flight, poses significant practical difficulties for designers of such systems. In particular, it would be unacceptably cumbersome to require currency to be loaded and unloaded while at short stopover locations, and equally unacceptable to require the system to include a large number of relatively heavy currency dispensers to accommodate a particular flight plan. Typically, an international flight plan for a single aircraft may require as many as four flight legs before the aircraft lands at a servicing facility at an airline hub of operations. Therefore, a currency dispenser should be capable of dispensing as many as four different currencies without manual intervention or servicing. Also, to achieve acceptable exchange rates, each currency has to be dispensed in two different denominations of notes and two different denominations of coins, thus requiring eight note dispensers and eight coin dispensers to accommodate four flight legs. Such a system would be too bulky and heavy for acceptable use on an aircraft.

In accordance with the present invention, the number of currency dispensers is kept to a minimum and switching from one currency to another is automatically achieved by controlling the system in response to sensed flight management system (FMS) data obtained while in flight. An important aspect of the invention is that only two note dispenser cassettes are used, to accommodate two different note denominations for each currency, but multiple currencies are loaded into the two cassettes, which are designated cassette A and cassette B in FIG. 1, referred to reference numerals 10 and 12. For the typical situation in which there are four flight legs for each flight profile between servicing points of the aircraft, four different currencies are loaded into each cassette 10 and 12. At each intermediate way-point, a control computer 14 senses the aircraft location from the FMS data acquired through the flight management system interface 16, and the remaining currency for that destination is rejected into a rejected note cassette 18 under control of the computer 14.

Figure 1:
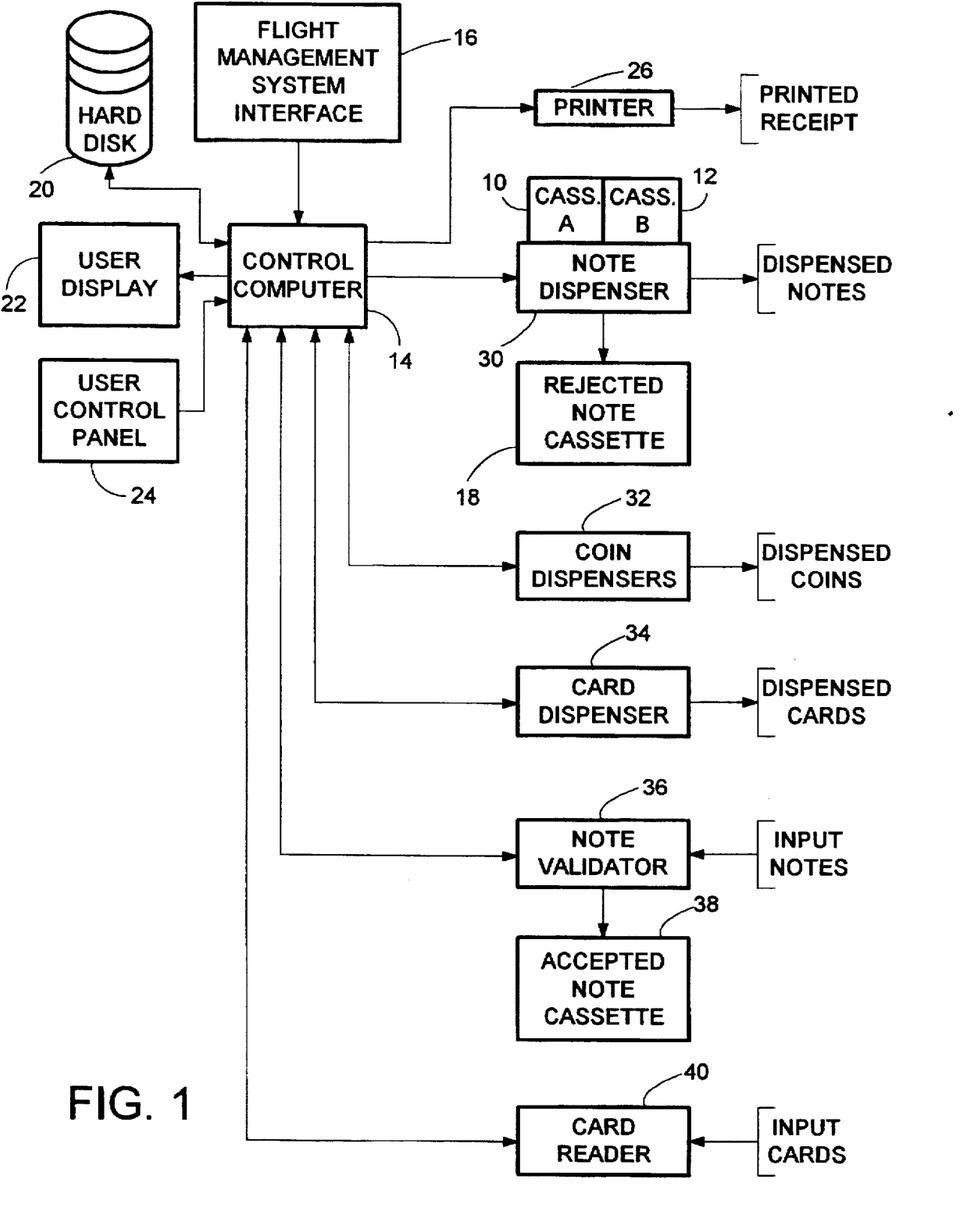
FIG. 1 is a block diagram of a system in accordance with the invention.

As shown in FIG. 1, the system of the invention also includes a conventional hard disk 20, a user display 22 and a user control panel 24 coupled to the computer 14 by conventional means. The computer 14 is also conventional, and may include, for example, a Pentium-based processor, a parallel output port for connection to a conventional printer 26, and multiple serial input/output ports for connection to various other components of the system. These components include a note dispenser 30, coin dispensers 32, a card dispenser 34, a note validator 36 with an associated accepted note cassette 38, and a card reader 40. The hard disk 20 contains various databases used by the control computer 14, such as a geographical database that permits the computer to identify the country in which the aircraft is presently located and an airport at which the aircraft has landed. Other databases contain the aircraft flight plan and exchange rates for the various countries, which may be updated during service at the start of a flight, or in flight with information received over the aircraft data communication system.

As will be explained in more detail below, the note dispenser 30 dispenses notes in two denominations of the currency of the next country in which the aircraft will land, referred to as the destination currency. The coin dispensers 32 perform the same function for two denominations of coins of the destination currency, again under control of the control computer 14. The note validator 36 receives notes of various currencies and denominations. Most currently available note validators are only capable of recognizing and validating a limited number of specific notes, but are conveniently programmable to change the currency and denomination of the notes that are validated. Accordingly, one of the functions performed at the start of a flight is to download to the validator 36 the specifications of notes that need to be validated, typically as many as eight different notes, on the flight that is about to begin. The validator 36 uses the associated accepted note cassette 38, to store the accepted notes until servicing at the end of the flight.

The card reader 40 accepts various types of magnetically or otherwise encoded cards, such as bank credit cards, automatic teller machine (ATM) debit cards, or other special-purpose cards.

The card dispenser 34 dispenses various types of "value" cards that are paid for by cash accepted by the note validator, or by credit or debit cards accepted through the card reader 40. The value cards may include telephone cards usable for long-distance calling, or gaming cards usable in gaming machines installed on the aircraft.

Figure 2:
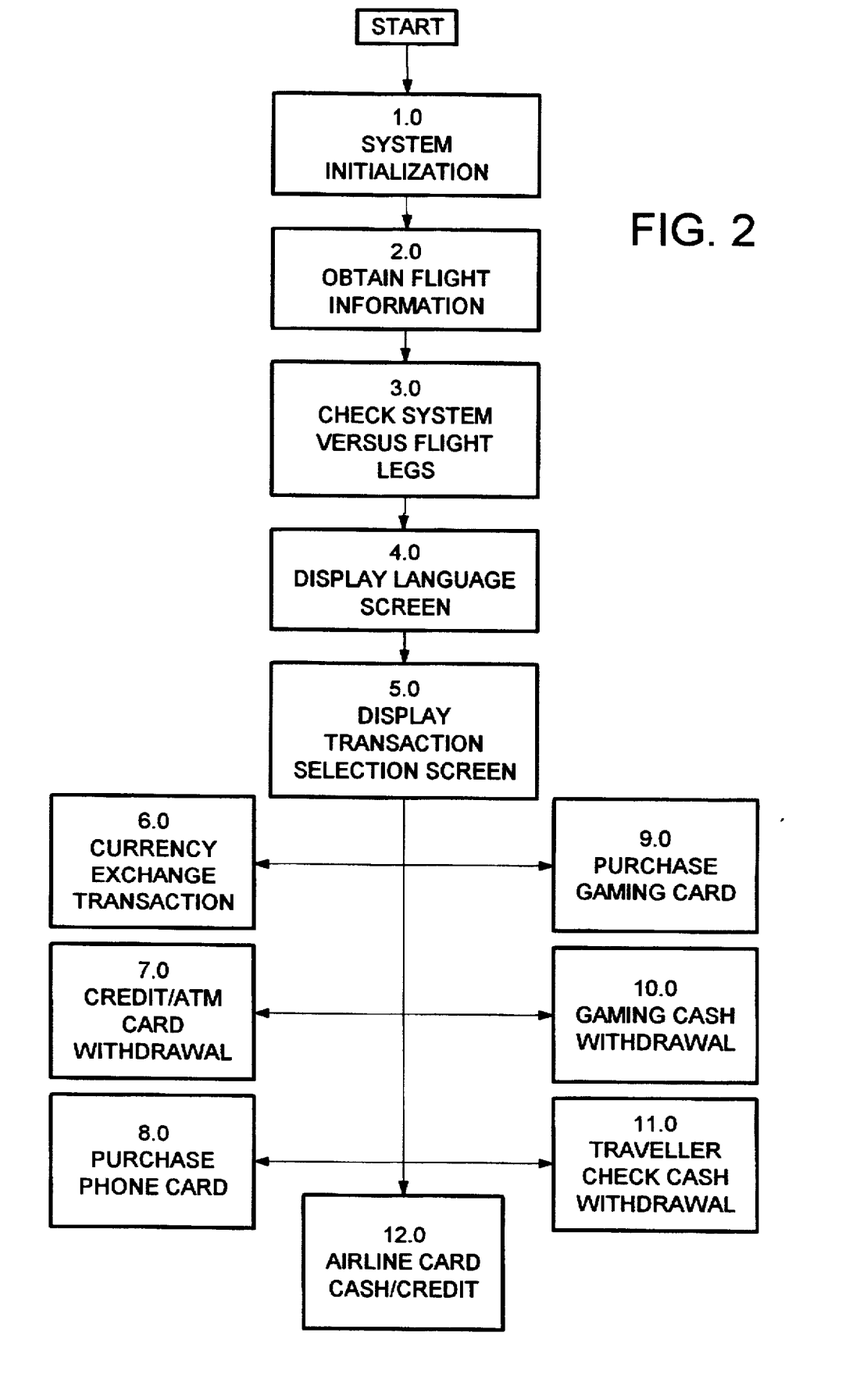
FIG. 2 is flowchart showing the principal functions performed by the system of FIG. 1.

FIG. 2 shows the broad functions performed by the system of the invention. Each block in the flowchart contains a reference number, such as 1.0, 2.0 and so forth. When a block in FIG. 2 is expanded to include more detailed functions in other drawing figures, the same initial number is used to associate the more detailed functions with the corresponding block of FIG. 2. For example, the first block of FIG. 2 is system initialization (1.0), which is shown in more detail in FIG. 3, including blocks 1.1 through 1.7.

As shown in FIG. 2, the broad functions of the system include system initialization (1.0), obtaining flight information (2.0), and checking system settings (3.0) to ensure that the system is appropriately configured for a particular flight. These three broad functions are described more fully with reference to FIGS. 3–5, respectively. Another broad function of the system is to display a language options screen for the user (4.0). This is simply a menu of language options that is displayed for each new user, who selects a language and thereby conditions the system to display each subsequent message or instruction in the selected language. The other illustrated broad function of the system is to display a transaction selection screen (5.0). Following the language selection screen, this screen allows the user to select from a menu of available transactions, including: currency exchange (6.0), credit/ATM card cash withdrawal (7.0), telephone card purchase (8.0), gaming card purchase (9.0), gaming card cash withdrawal (10.0) and traveler's check cash withdrawal (11.0), all of which are more fully described with reference to other drawing figures.

Figure 3:
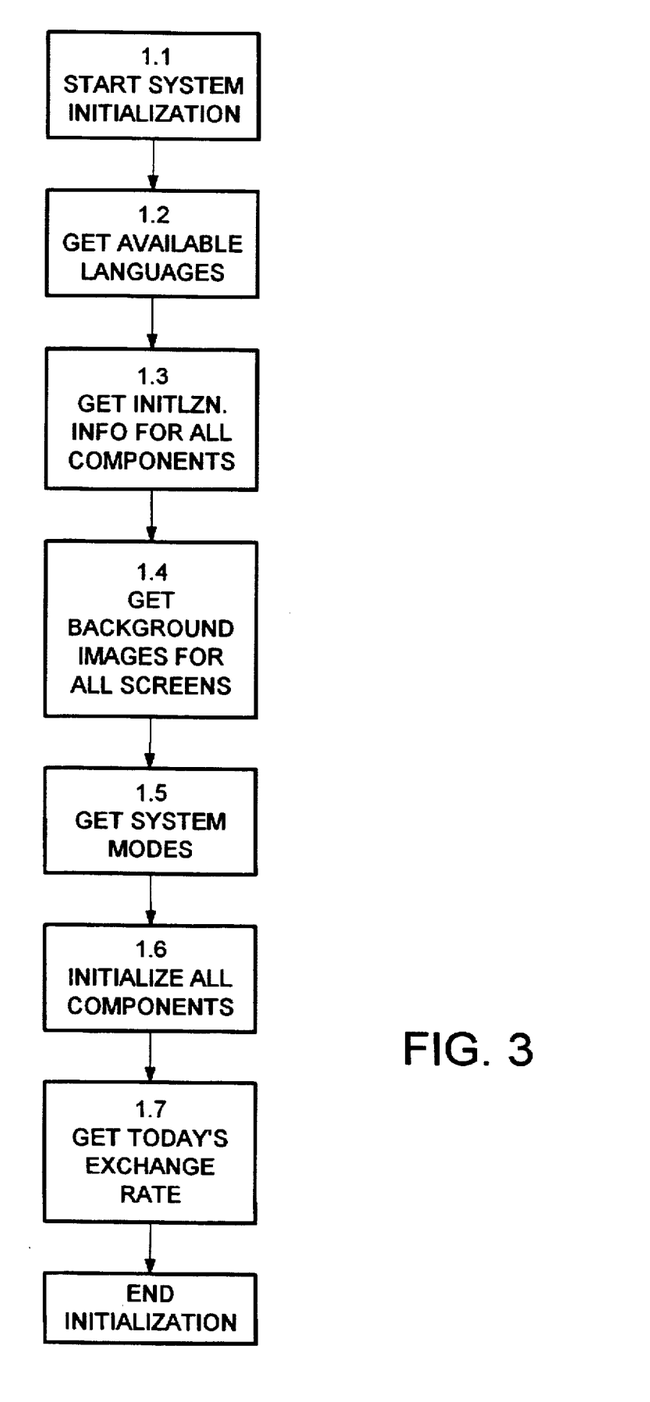
FIG. 3 is a flowchart showing the initialization function of FIG. 2 in more detail.

Initialization of the system is shown in more detail in FIG. 3, and encompasses those functions performed when the system is initialized for a specific flight, which may include multiple flight legs. After start of initialization (1.1), the system obtains the available languages (1.2) from a database stored on the hard disk 20 and sets up these languages as options to be displayed in the language screen (4.0) seen later by the users. The system then obtains initialization information for each of the system components (1.3). This information is also typically found in databases on the hard disk 20. For example, the note validator 36 will need to be initialized to contain selected currency note validation capability. The currencies needed are determined from the flight plan, which is also stored on the hard disk 20. As indicated in block 1.4, the system obtains background images for all of the screens to be displayed for the user. These screen images may be tailored to the specific flight information, for example. The next step in initialization is to obtain the available system modes (1.5). Not all the modes of operation may be available for a particular flight, either because of international agreements or simply because components may be temporarily inoperative. The available system modes are needed for display to the user (5.0, FIG. 2), and to permit appropriate initialization of the components, which is performed as indicated in block 1.6. Each system component typically has an initialization procedure to condition the component to receive subsequent commands. For example, the note validator 36 is initialized to process selected currency notes. The note and coin dispensers 30 and 32 may need to be initialized before accepting commands to dispense currency.

Finally, initialization includes obtaining the latest currency exchange rates (1.7). These may be supplied on a data storage diskette inserted into the computer 14 by a service operator, or may be obtained through the aircraft data communication system.

Figure 4:
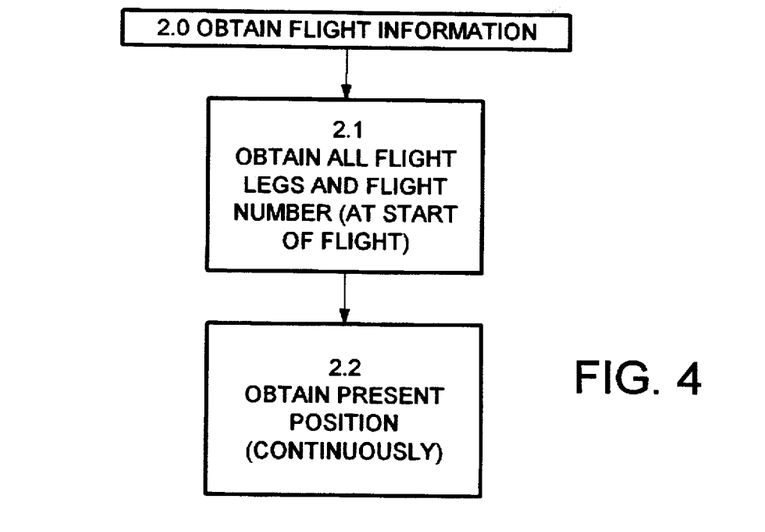
FIG. 4 is a flowchart showing the function of obtaining flight information (from FIG. 2) in more detail.

As shown in FIG. 4, the system must also be initialized to contain the current flight information (2.1), including definitions of the flight legs and the flight number or numbers used by the airline. Once this information is known to the system, the required currencies may also be readily derived. A maintenance operator loads the note and coin dispensers 30 and 32 with the appropriate currencies, and the system is then ready for use by passengers on the aircraft.

An important aspect of the system is that the present position of the aircraft is continuously monitored by the control computer 14, through the flight management system interface 16. This data, and other flight data, are made available to the computer 14 in a format defined by an industry standard specification, referred to as ARINC Specification 429P1-15, published Sep. 1, 1995, by Aeronautical Radio, Inc., 2551 Reva Road Annapolis, Md. 21401. The data available from the flight management system (FMS) includes the flight number, the flight origin and destination airports, and the present position in terms of latitude and longitude. Other information available from the FMS includes the aircraft ground speed, airspeed, heading and other navigational data of little or no significance to the present invention. From the flight number and destination airport information, the system of the invention can determine the destination currency. When the destination airport and/or flight number changes, the system can determine the next destination currency and send appropriate commands to the currency dispensers 30 and 32. The current position in latitude and longitude provides confirmation of the choice of destination currency, and may also be used to impose restrictions on selected system functions. For example, the issue of gaming cards may be restricted to locations over international waters, or prohibited when flying over certain countries.

Figure 5:
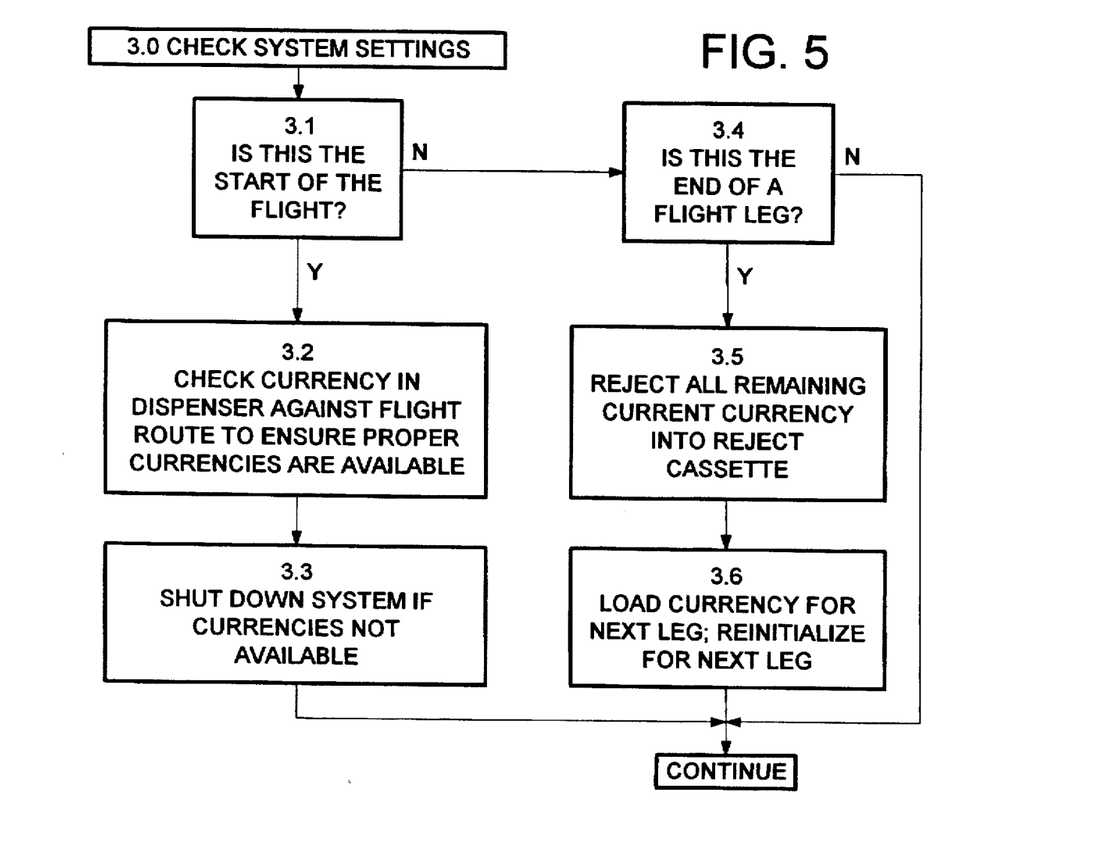
FIG. 5 is a flowchart showing the function of checking system settings (from FIG. 2) in more detail.

As shown in FIG. 5, the system has to issue commands to its components based on the flight data obtained through the FMS interface 16. At the start of a flight, as determined in block 3.1, the system (in block 3.2) checks the currencies known to be in the dispenser 30 against the known flight route, to ensure that proper currencies will be available throughout the route. If this is not the case, the system is shut down (3.3) to avoid dispensing the wrong currencies. A similar check may be made periodically during the flight, to ensure that the aircraft has not been diverted to another country.

On arrival at a destination airport, and the end of a flight leg, as determined in block 3.4, the unused bills in the currency for this destination stored in cassettes A and B (10 and 12) are rejected into the rejected note cassette 18. In each cassette A and B, up to four different currencies are stored, corresponding to the destinations at the ends of the flight legs. The currencies may separated by an easily detectable divider, or the rejection process of the dispenser 30 may be capable of detecting a change in currency. In any event, this aspect of the invention makes use of a standard feature of currency dispensers found in conventional ATMs. When an ATM dispenses cash, the currency is counted into a holding area and various tests are performed to ensure that the correct number of notes has been dispensed. Only after the tests are passed do the notes become available to the user. If any of the tests is failed, the notes are "rejected" into a sealed hopper in the machine. The "reject" function as used in the present system, rejects the remaining notes of the destination currency into the rejected note cassette 18, as indicated in block 3.5. After the rejection of these remaining notes, the note dispenser 30 and the coin dispenser 32 are initialized (block 3.6) for the next leg of the flight, using a new destination currency as determined from the flight data.

In the presently preferred embodiment of the invention, the coin dispensers 32 do not employ this rejection principle for each flight leg. Instead, eight separate coin dispensers are provided, and one pair of which is selected by the computer 14 at the start of each flight leg. It will be recalled that two denominations of notes and coins are made available for each destination currency.

Figure 6:
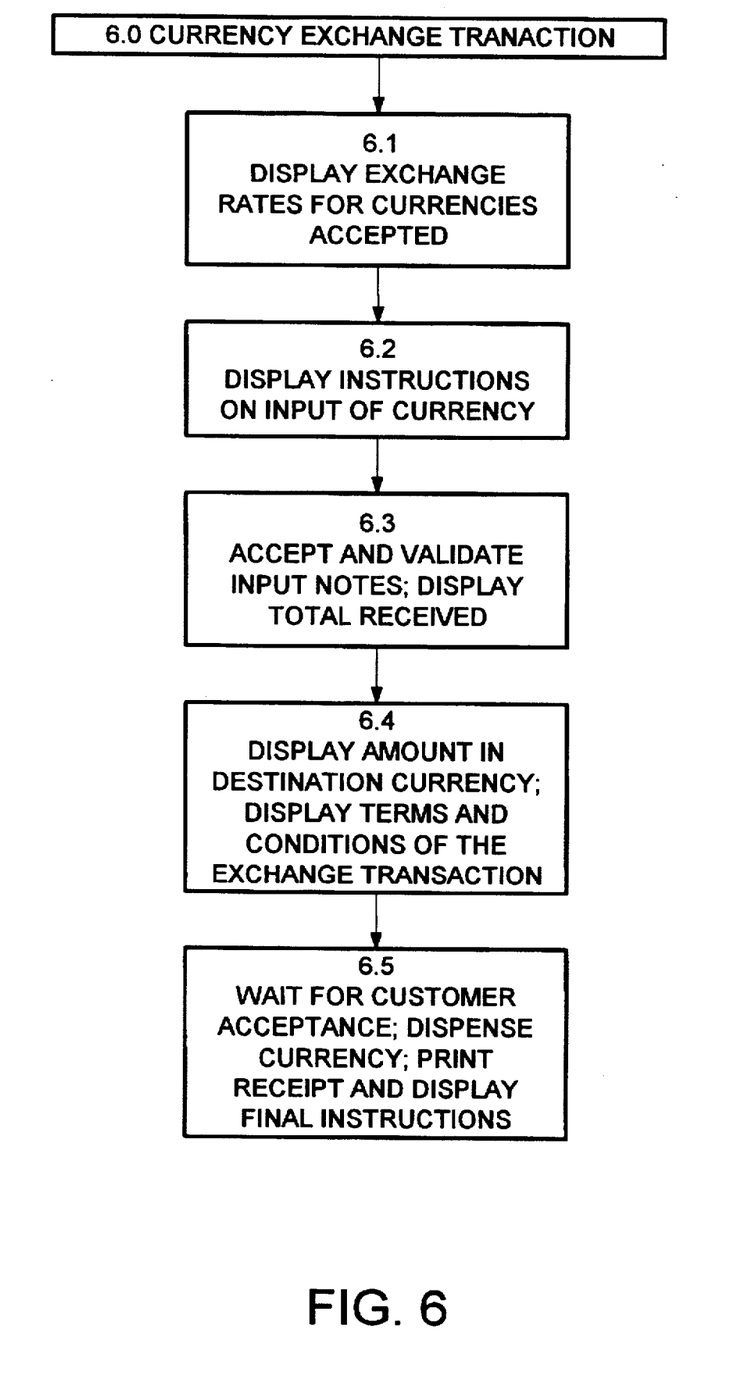
FIG. 6 is a flowchart showing the currency exchange function of FIG. 2 in more detail.

FIG. 6 depicts the operations performed in a currency exchange transaction. First, the system displays the exchange rates for currencies accepted by the system (6.1). Then user instructions are displayed (6.2) to explain to the user how to insert notes into the note validator 36. Notes inserted into the validator are accepted and validated (6.3). Notes that fail to be pass one of the validation tests are immediately ejected. Accepted and validated notes are held in the accepted note cassette 38 for later collection when the system is serviced. The total of the notes accepted is then displayed for the user, together with the amount that would be dispensed in the destination currency (6.4). The terms and conditions of the transaction are also displayed. Finally (6.5), when the customer agrees to the terms and conditions by actuating an appropriate key on the user control panel 24, the destination currency is dispensed from the note dispenser 30 and appropriate coin dispenser 32. A receipt is printed for the user and final instructions are displayed, indicating how to retrieve the receipt. The system then returns to the transaction selection screen (5.0).

Figure 7:
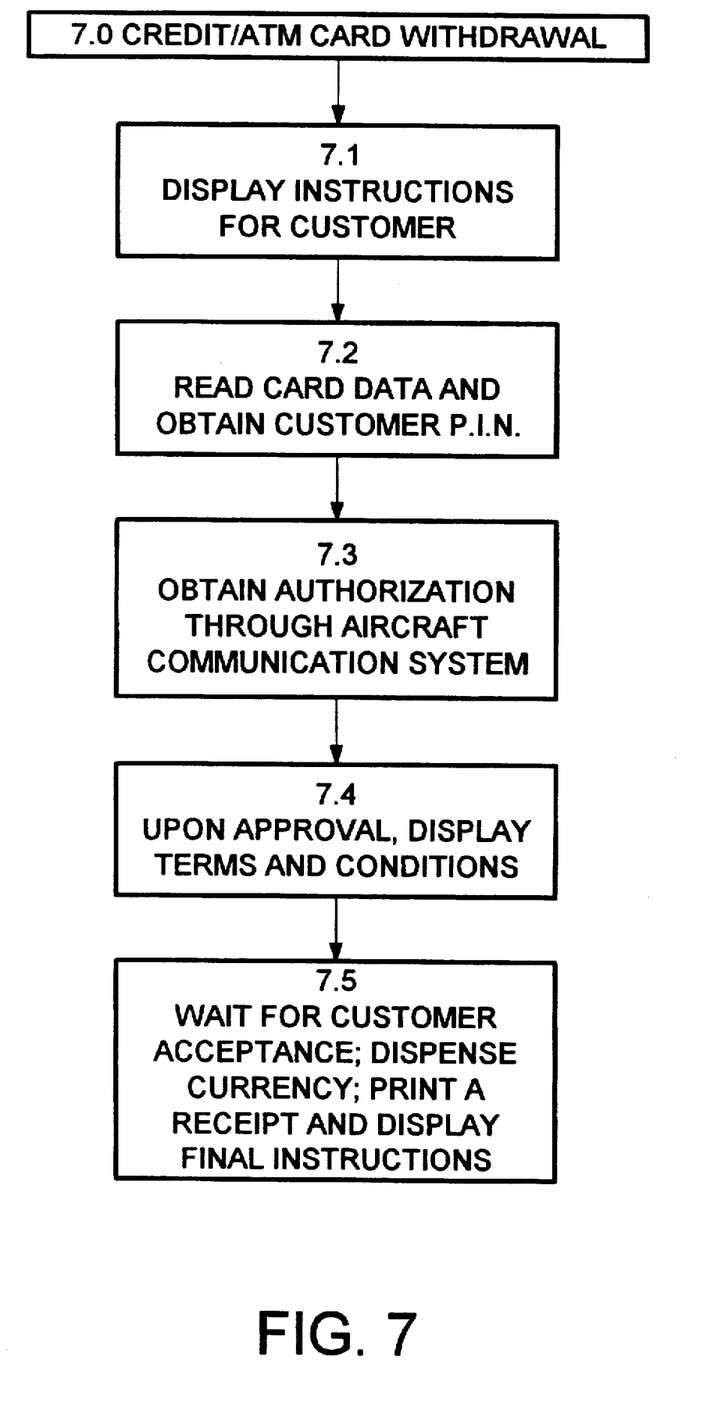
FIG. 7 is a flowchart showing the credit/ATM card withdrawal function of FIG. 2 in more detail.

Withdrawal of cash based on presentation of a credit card or ATM card is depicted in FIG. 7. First, the customer instructions are displayed (7.1), then the card is read (7.2) by the card reader 40, which may include motor driven pinch rollers to pull the card into the system apparatus, or a sensor located in a groove through which the customer "swipes" the card. The system also requests that the customer enter a cash amount requested and a personal identification number (PIN) to confirm the transaction. Then the system obtains authorization to charge the requested amount to the card. This step requires use of the aircraft data communication link, but is otherwise similar to the procedure followed by merchants when obtaining authorization to charge a credit card. The terms and conditions of the transaction are displayed for the customer (7.4) and, upon customer acceptance, the requested amount of cash is dispensed (7.5) from the note dispenser 30 and, if necessary, the coin dispenser 32, using the destination currency.

Figure 8:
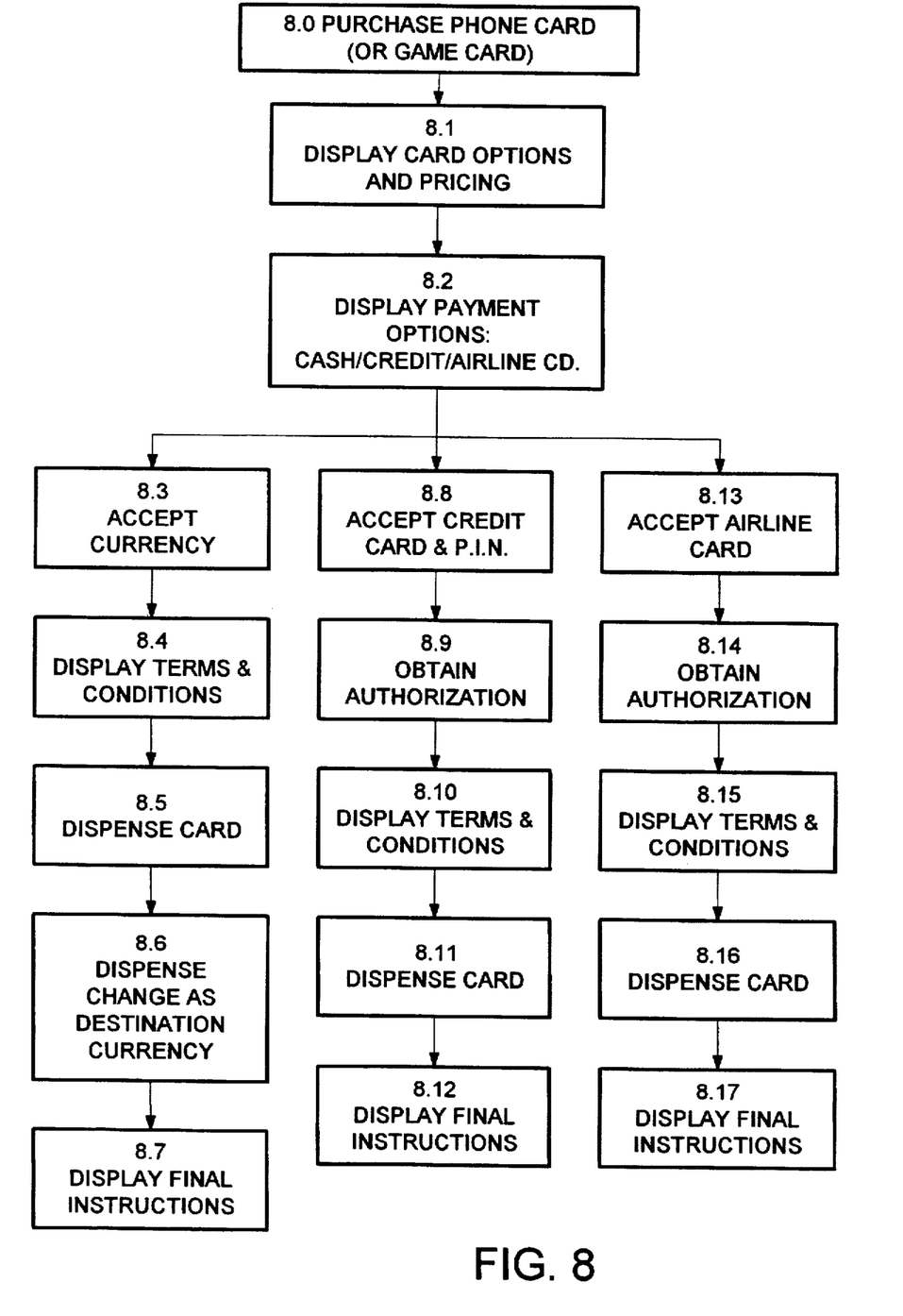
FIG. 8 is a flowchart showing the function of purchasing a value card, such as a telephone card or gaming card, in more detail.

FIG. 8 shows how a value card is dispensed in response to payment by one of three alternative payment methods. First, the card options and pricing alternatives are displayed (8.1). Then the payment options are displayed (8.2), including payment by cash, payment by credit or ATM debit card, or payment using a special card such as an airline-issued card.

For the cash payment option, first the currency is accepted and validated (8.3). Then the terms and conditions of the transaction are displayed (8.4) and, if accepted by the customer, the card is dispensed (8.5) from the card dispenser 34 (FIG. 1). Since the card may be dispensed only with certain preselected values, such as $10, $20 and so forth, the currency accepted for payment may not exactly correspond to the selected amount of value for the card. Therefore, a further step may be needed, to dispense the customer's "change" in the form of destination currency from the note and coin dispensers 30 and 32, as indicated at 8.6. After the card and possible cash have been dispensed, the system displays the final user instructions (8.7) and prints a receipt.

If payment for a value card is in the form of a credit card, the system accepts the card and PIN (8.8) and obtains authorization (8.9). The terms and conditions of the transaction are displayed (8.10), the purchased card is dispensed (8.11) and the final user instructions are displayed (8.12). A receipt may also be printed in this step.

If payment for a value card is in the form of another type of card, such as one issued by an airline, the steps parallel those for payment by credit card, as depicted in blocks 8.13 through 8.17.

The steps depicted in FIG. 8 apply to the dispensing of any type of value card, which may be a telephone card for making long-distance calls, either on the aircraft or on the ground in a destination country, or such as a gaming card used to operate gaming machines installed on the aircraft.

Figure 9:
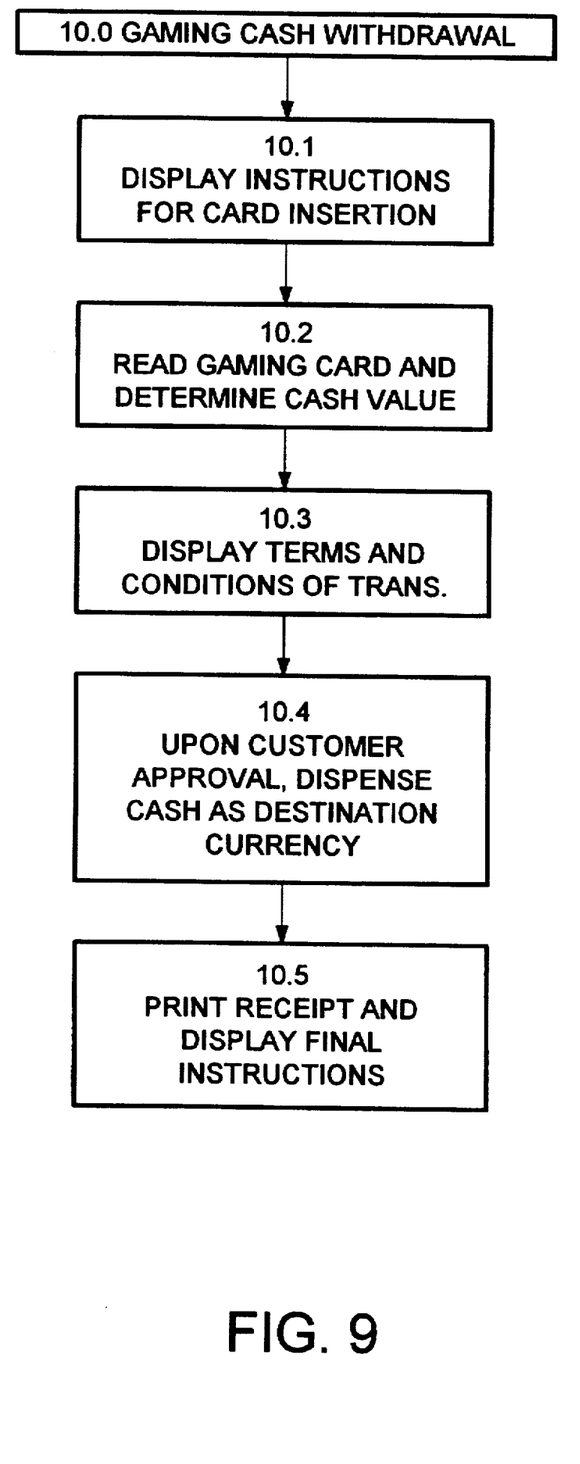
FIG. 9 is a flowchart showing the gaming cash withdrawal function of FIG. 2 in more detail.

FIG. 9 shows the procedure for cashing in a gaming card, which has been used in various games of chance and has its encoded value increased or decreased as a result of participation in those games. The customer who wishes to exchange the card for cash in the destination currency reads the displayed instructions for card insertion (10.1) and inserts the gaming card in the card reader 40. The system reads the card and determines its cash value. The system them displays the terms and conditions of the transaction (103). Upon customer approval, the system dispenses the appropriate amount of cash in the destination currency (10.4) and prints a receipt and final instructions for the customer (10.5).

Figure 10:
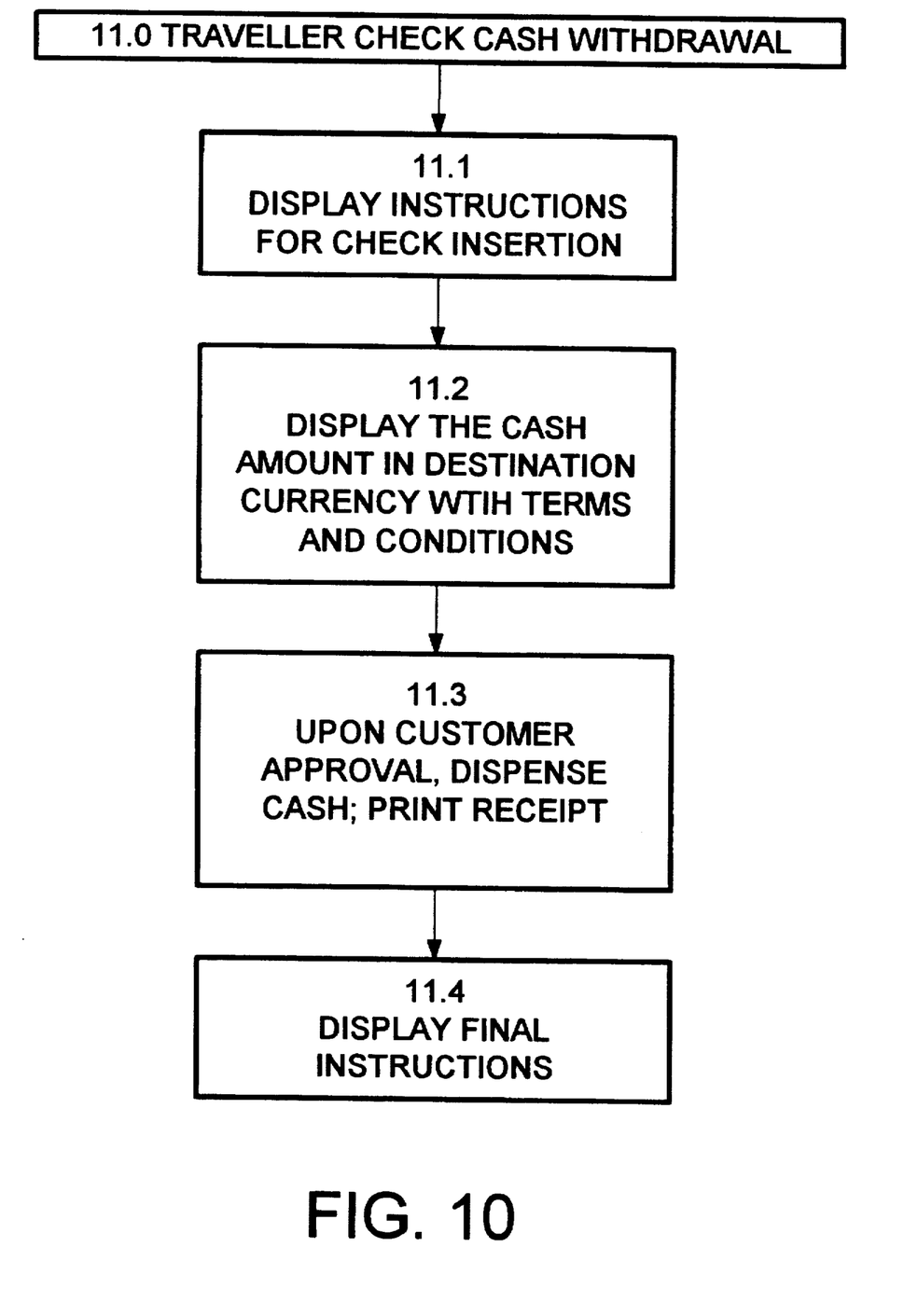
FIG. 10 is a flowchart showing the traveler's check cash withdrawal function of FIG. 2 in more detail.

Traveler's check cashing is similar to a currency exchange operation, as indicated in FIG. 10. First the instructions are presented to the customer (11.1), who is instructed to sign the check and place it in the note validator 36, or in a special traveler's check validator (not shown). On acceptance of the check, the system displays the cash amount (in destination currency) and the terms and conditions for the customer approval (11.2). Upon approval, the cash is dispensed (11.3) and a receipt is printed. The customer is then presented with final instructions (11.4).

In some instances, an airline may prefer to encourage the use of its own value card for use by customers on the flight.

Figure 11:
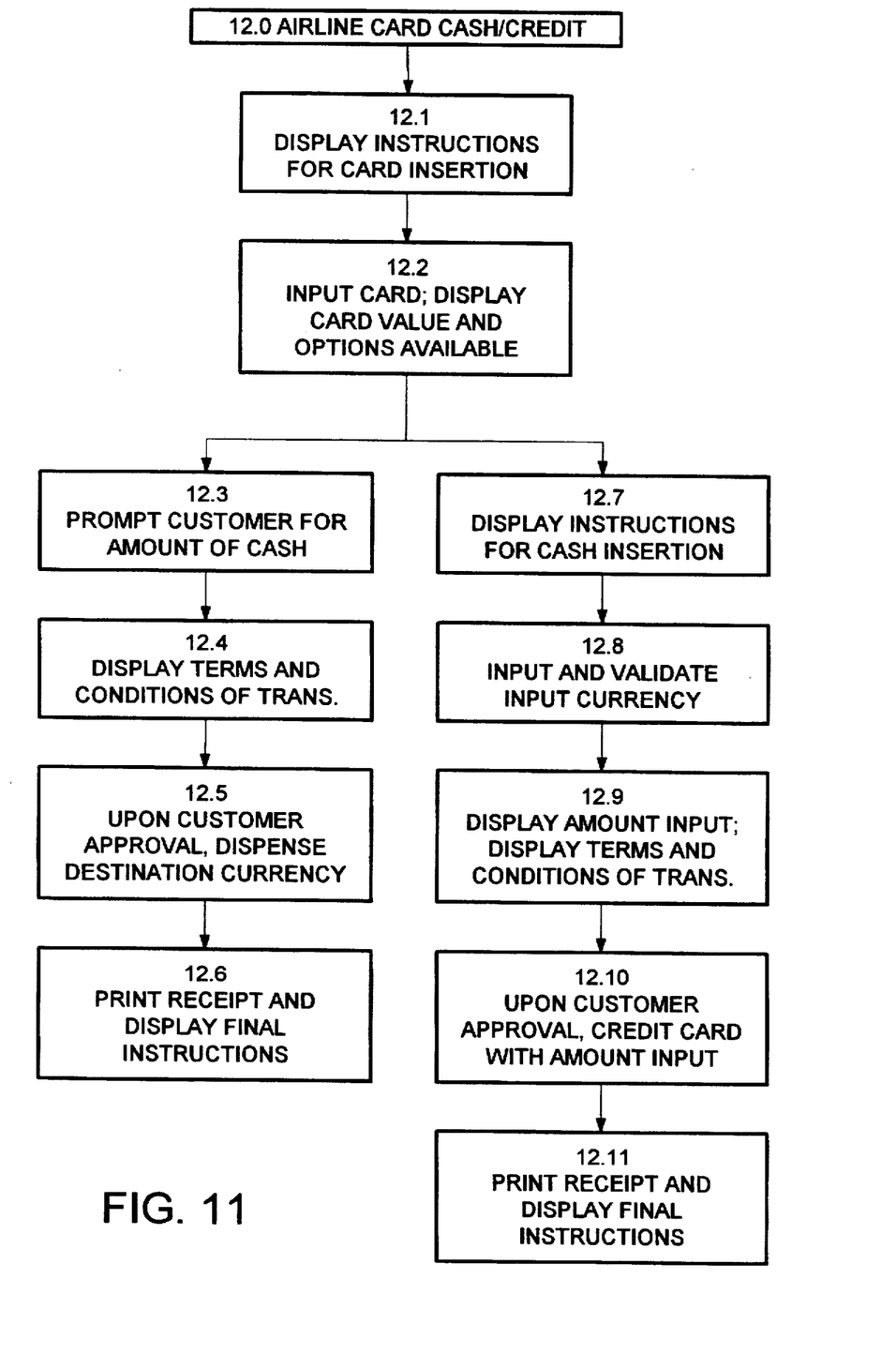
FIG. 11 is a flowchart showing the airline card cash/credit function of FIG. 2 in more detail.

The card may be presented to the system of the present invention for either adding more value to the card or obtaining cash from the card, which functions are illustrated in FIG. 11. The special airline value card may also be used to purchase another type of value card, such as a gaming or telephone card, as shown in FIG. 8. If the airline card cash or credit option is selected (12.0 in FIG. 2), the system first displays instructions for the insertion of the card (12.1). Then the card is read and the system displays the card value and the options that are available (12.2), such as adding or withdrawing cash.

If withdrawing cash is selected, the system prompts the customer for the amount of cash being requested (12.3), displays the terms and conditions of the transaction (12.4), and dispenses the cash in destination currency (12.5) if the customer agrees to the terms and conditions. Finally (12.6) a customer receipt is printed and final instructions are displayed for the customer. If adding cash to the card is the option selected, the system displays instructions for the customer (12.7), accepts and validates the input currency (12.8), displays the terms and conditions of the transaction (12.9), and updates the card (12.10) with additional value (12.10) once the customer has approved the transaction. Finally, a receipt is printed (12.11) and final instructions are displayed for the customer.

It will be appreciated from the foregoing description that the system of the invention is a general purpose currency dispensing machine, dispensing destination currency in exchange for another currency, for a traveler's check, or for value inherent in a value card. The system of the invention may also be used to dispense a value card in exchange for cash or another type of value card. A key feature of the various forms of the invention is that the system always dispenses cash in the next destination currency of the aircraft, as determined automatically from flight management data obtained on the aircraft. Although a specific embodiment of the invention has been described for purposes of illustration, it will be appreciated that various modifications may be made without departing from the spirit and scope of the invention. Accordingly, the present invention should not be limited except as by the accompanying claims.

What is claimed is:

1. A system for dispensing cash during an international journey of a vehicle, in exchange for a token of value presented by a customer, the system comprising:

a note dispenser for storing notes of multiple currencies corresponding to countries at which the vehicle will arrive in the course of an itinerary between service points;

a validation subsystem, for validating a token of value inserted into the validation subsystem by a customer;

a control computer coupled to the note dispenser and to the validation subsystem;

a navigation interface coupled to the control computer, to supply data defining the vehicle's location and next destination in its itinerary;

means in the control computer for determining a next destination currency based on data obtained from the navigation interface; and means in the control computer for conditioning the note dispenser to dispense only the next destination currency, whereby the system automatically dispenses only appropriate currency as the vehicle progresses along its itinerary.

2. A system as defined in claim 1, wherein:

the note dispenser stores the multiple currencies in at least one stack in which the currencies are arranged sequentially consistent with the vehicle itinerary; and the note dispenser includes a rejected note cassette; and the means for conditioning the note dispenser includes means for passing all unused notes of a prior destination currency into the rejected note cassette, whereby, notes of the next destination currency are readied for dispensing.

3. A system as defined in claim 1, wherein the validation subsystem includes a note validator for accepting and validating notes of various currencies.

4. A system as defined in claim 1, wherein the validation subsystem includes:

a card reader, for reading an encoded card having inherent value; and means under control of the control computer, for obtaining authorization to charge the card for purchased currency.

5. A system as defined in claim 4, wherein the encoded card is a credit or debit card.

6. A system as defined in claim 4, wherein the encoded card is a special purpose value card.

7. A system as defined in claim 1, wherein the validation subsystem includes:

means for accepting and validating traveler's checks, whereby cash in the destination currency may be dispensed in exchange for a traveler's check.

8. A system as defined in claim 1, and further comprising:

a value card dispenser, for dispensing an encoded card in exchange for a token of value accepted and validated by the validation subsystem.

9. A system as defined in claim 8, wherein the token accepted and validated by the validation subsystem includes a value card, whereby a value card may be purchased or increased in value.

10. A system as defined in claim 8, wherein the token accepted and validated by the validation subsystem includes notes of multiple currencies, whereby a value card may be purchased for cash.

11. A system as defined in claim 1, and further comprising a coin dispenser for dispensing coins in multiple currencies as needed to supplement the dispensed notes.

12. A system for dispensing cash onboard an aircraft in exchange for valuable record-bearing media presented by a customer, the system comprising:

a note dispenser for holding notes of multiple currencies stacked in a currency sequence corresponding to countries that the aircraft is scheduled to visit;

a validation subsystem, for validating the valuable record-bearing media presented by the customer;

a control computer coupled to the note dispenser and to the validation subsystem;

an input port associated with the control computer, for inputting flight management data including aircraft location and destination;

means in the control computer for identifying a next destination currency based on the flight management data; and means in the control computer for conditioning the note dispenser to dispense only the next destination currency.

13. A system as defined in claim 12, wherein:

the means for conditioning the note dispenser includes means operable when the aircraft reaches an intermediate destination, for rejecting all remaining notes of the intermediate destination currency into a holding container, whereby notes of the next destination currency are readied for dispensing.

14. A system as defined in claim 12, wherein:

the valuable record-bearing media presented by the customer include notes of selected currencies; and the validation subsystem includes a note validator, for accepting and validating the notes of selected currencies.

15. A system as defined in claim 12, wherein:

the valuable record-bearing media presented by the customer include encoded cards having inherent value; and the validation subsystem includes a card reader and means in the control computer for obtaining authorization to charge a purchase to a card.

16. A system as defined in claim 12, and further comprising:

a coin dispenser for dispensing coins of multiple selected currencies as needed to supplement notes dispensed by the note dispenser.

17. A system as defined in claim 12, and further comprising:

a value card dispenser, for dispensing a card with inherent value when used in another system, in exchange for the valuable record-bearing media presented by the customer.

18. A method for dispensing cash in an aircraft, comprising the steps of:

loading a note dispenser with bills of multiple currencies when the aircraft is serviced on the ground;

obtaining flight management data from a flight management data system on the aircraft, the flight management data including flight identification and destination data;

identifying a next destination currency based on the flight management data;

accepting and validating payment presented by a customer desiring to take part in a monetary transaction; and dispensing cash in the next destination currency in response to the customer's presentation of payment.

19. A method as defined in claim 18, and further comprising:

upon reaching an intermediate destination, conditioning the note dispenser to dispense a different next destination currency.

20. A method as defined in claim 19, wherein the step of accepting and validating includes accepting and validating notes of various selected currencies.

21. A method as defined in claim 19, wherein the step of accepting and validating includes accepting and validating traveler's checks.

22. A method as defined in claim 19, wherein the step of accepting and validating includes accepting and validating an encoded value card.

23. A method for handling monetary transactions in an aircraft, comprising the steps of:

loading a note dispenser with bills of multiple currencies when the aircraft is serviced on the ground;

obtaining flight management data from a flight management data system on the aircraft, the flight management data including flight identification and destination data;

identifying a next destination currency based on the flight management data;

accepting and validating a payment submitted by a customer;

dispensing a value card in response to the submission of payment; and dispensing change to the customer, if needed, in the form of cash in the next destination currency.

24. A method as defined in claim 23, and further comprising:

accepting and validating the value card as containing inherent value; and dispensing cash in the next destination currency, in exchange for submission of the value card.

* * * * *